Oct. 18, 1927.

O. G. MAYER 1,645,610

MACHINE FOR LINKING SAUSAGES

Filed May 17, 1926     5 Sheets-Sheet 1

Inventor
Oscar G. Mayer
by Henry Meek
Attorney

Oct. 18, 1927.

O. G. MAYER 1,645,610

MACHINE FOR LINKING SAUSAGES

Filed May 17, 1926     5 Sheets-Sheet 2

Inventor
Oscar G. Mayer
by Henry Heck
Attorney

Oct. 18, 1927.  
O. G. MAYER  
1,645,610  
MACHINE FOR LINKING SAUSAGES  
Filed May 17, 1926   5 Sheets-Sheet 3

Inventor  
Oscar G. Mayer  
by Henry Heck  
Attorney.

Oct. 18, 1927. 1,645,610
O. G. MAYER
MACHINE FOR LINKING SAUSAGES
Filed May 17, 1926   5 Sheets-Sheet 4
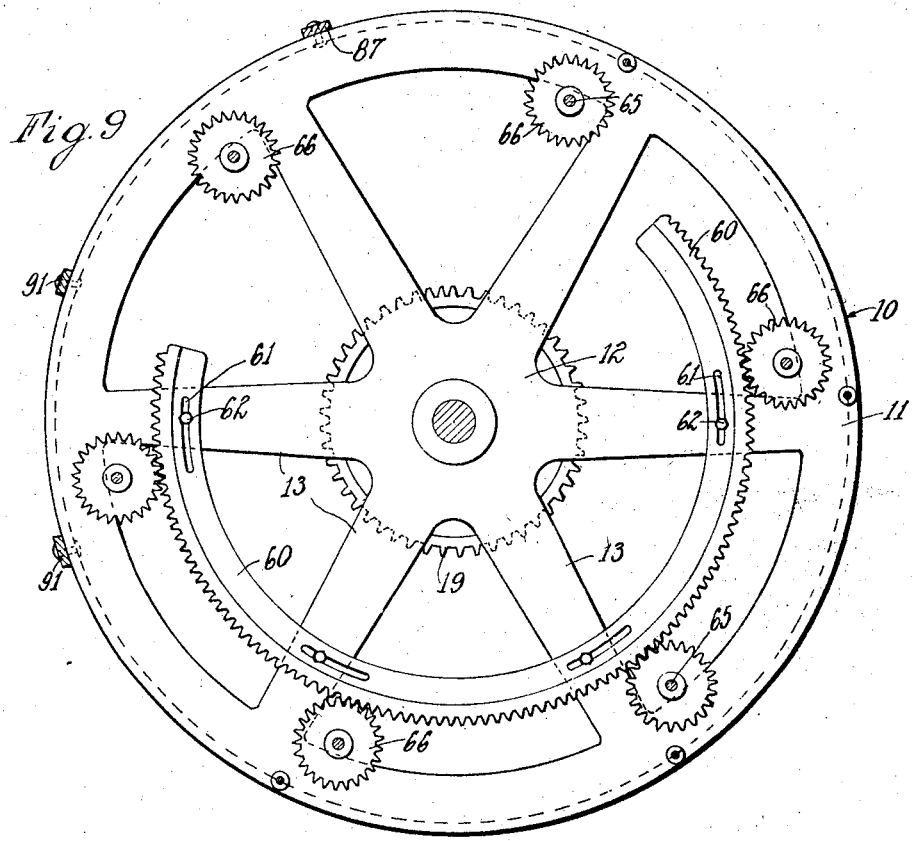
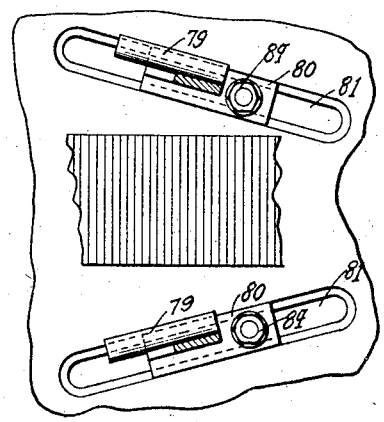
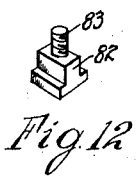
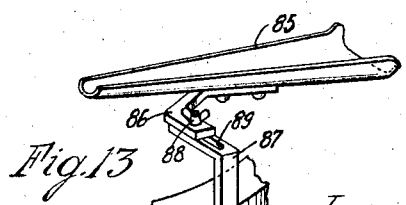
Inventor
Oscar G. Mayer
by Henry Bleeh
Attorney Oct. 18, 1927.  
O. G. MAYER  
1,645,610  
MACHINE FOR LINKING SAUSAGES  
Filed May 17, 1926     5 Sheets-Sheet 5

Inventor  
Oscar G. Mayer  
by *Henry Heck*  
Attorney

Patented Oct. 18, 1927.

1,645,610

UNITED STATES PATENT OFFICE.

OSCAR G. MAYER, OF CHICAGO, ILLINOIS.

MACHINE FOR LINKING SAUSAGES.

Application filed May 17, 1926. Serial No. 109,509.

The invention relates to machines for linking sausages.

In my copending application, Serial No. 46,794, filed July 29th, 1925, a machine for linking sausage casings is described in which a plurality of friction members revolve a sausage casing around its longitudinal axis, the casing being held at spaced points so as to effect linking.

The principal object in the present case consists in providing gravity actuated means for engaging a sausage casing at remote points and flexible means for revolving the casing between points of engagement.

A further object consists in providing a single means for revolving a sausage casing held at spaced points around its longitudinal axis.

A further object consists in providing a single member having portions reciprocating in opposite directions for revolving a sausage casing around its longitudinal axis.

The invention further has for its object the provision of certain features of construction and arrangement tending to enhance the usefulness and reliability of the machine of the character described.

To the accomplishment of the objects stated and others that will become apparent upon perusal of the description of the invention, the latter comprises the means described in the following specification, particularly pointed out in the claims forming a part thereof, and illustrated in the accompanying drawings, in which:

Figure 1:
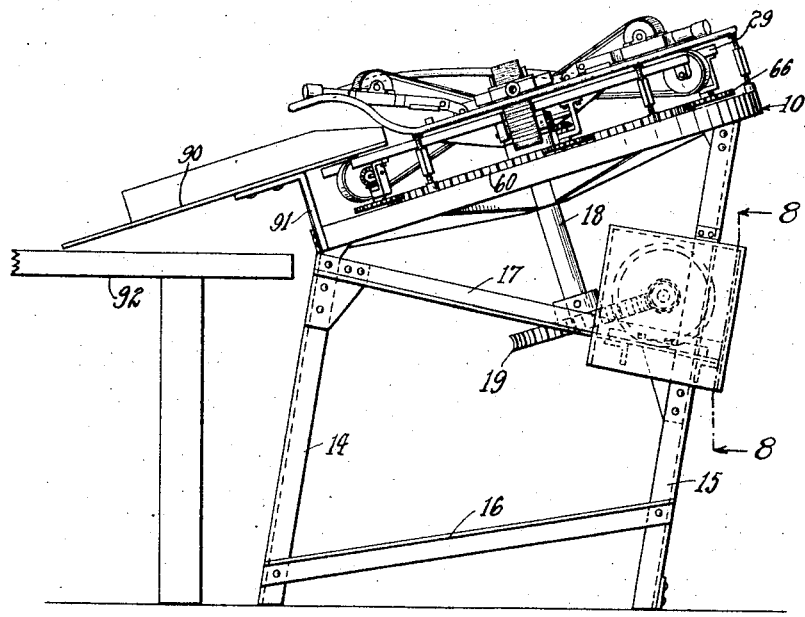
Figure 1 is an elevational view of the machine constructed in accordance with my invention.
Figure 7:
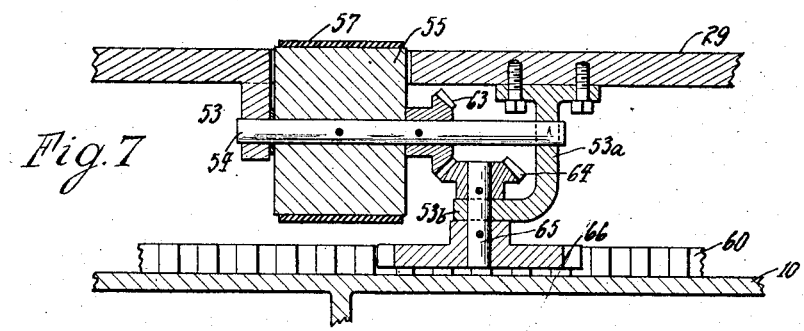
Figure 8:
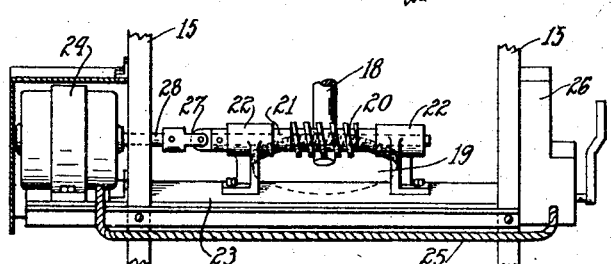
Figure 2:
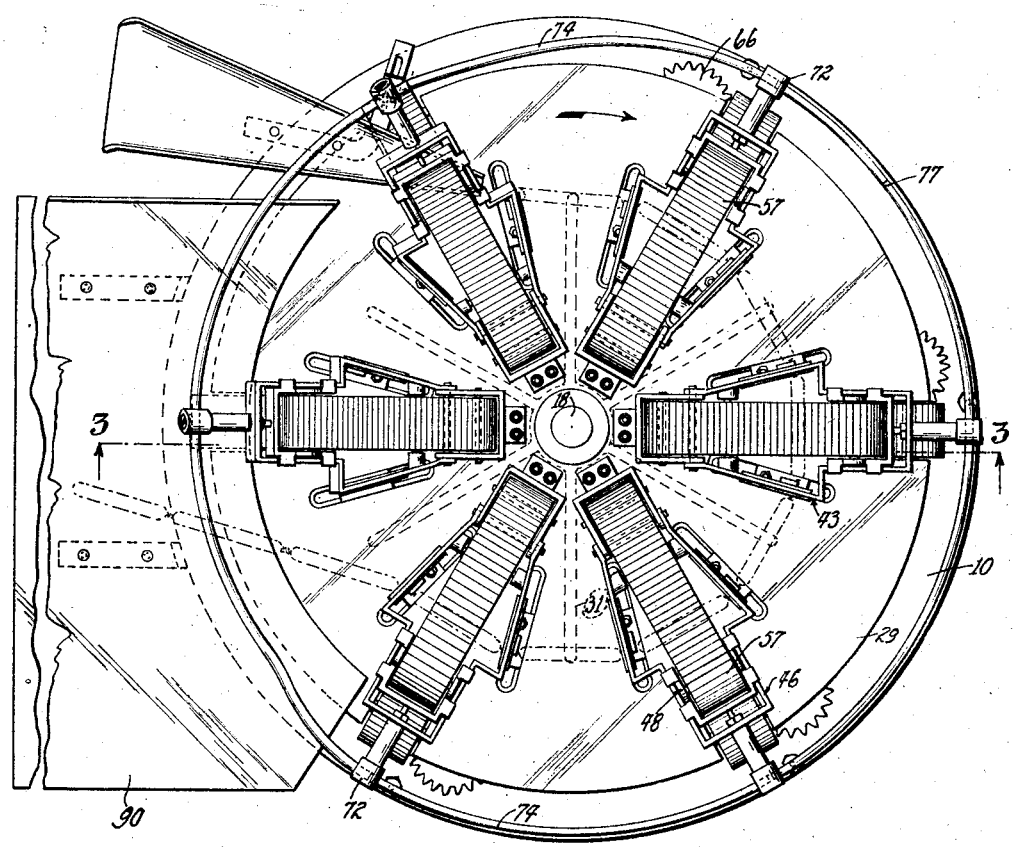
Figure 2 is a top plan view of the machine.
Figure 3:
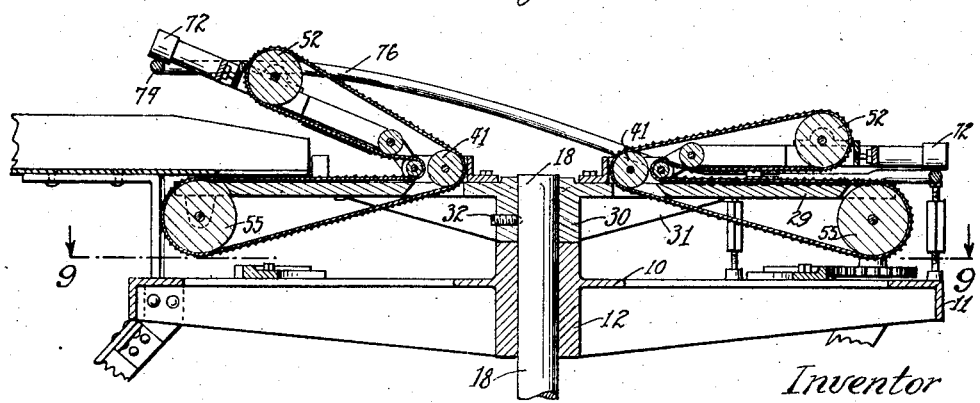
Figure 3 is a section on the line 3—3 of Figure 2.
Figure 4:
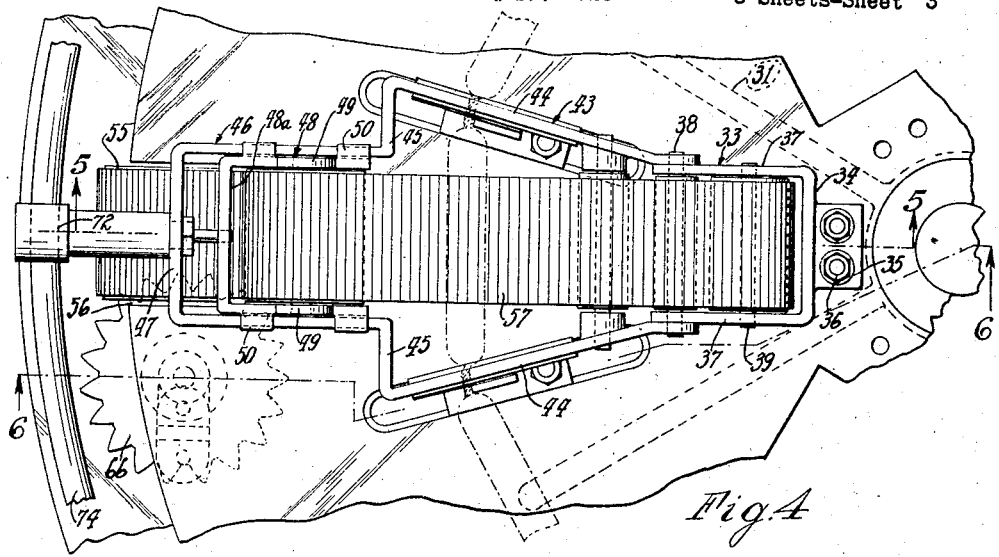
Figure 4 is an enlarged fragmentary top plan view of the machine.
Figure 5:
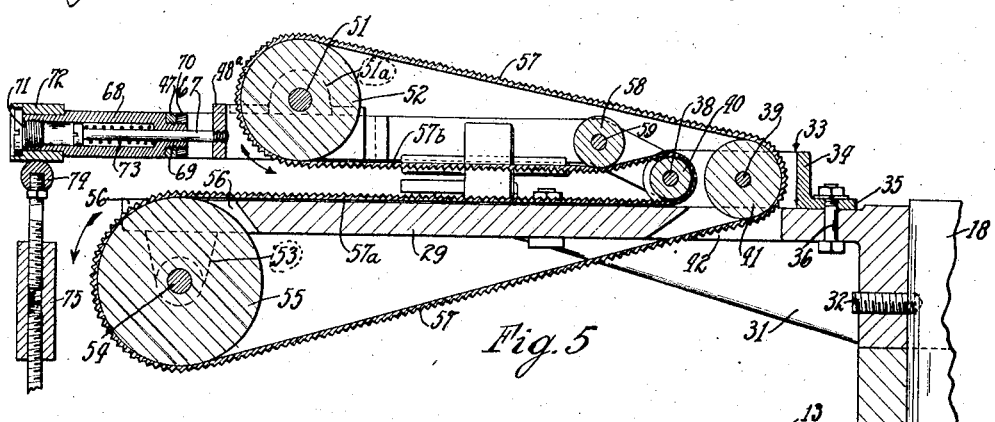
Figure 6:
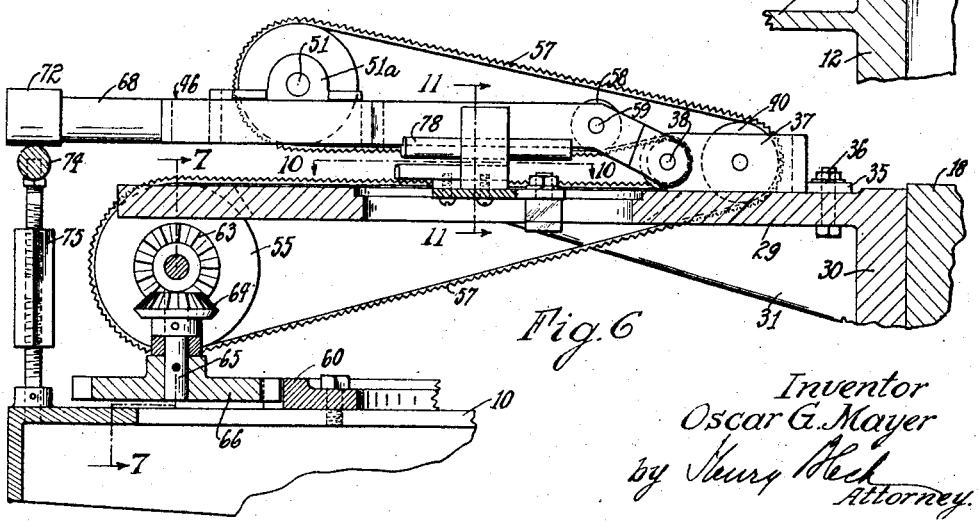
Figure 14:
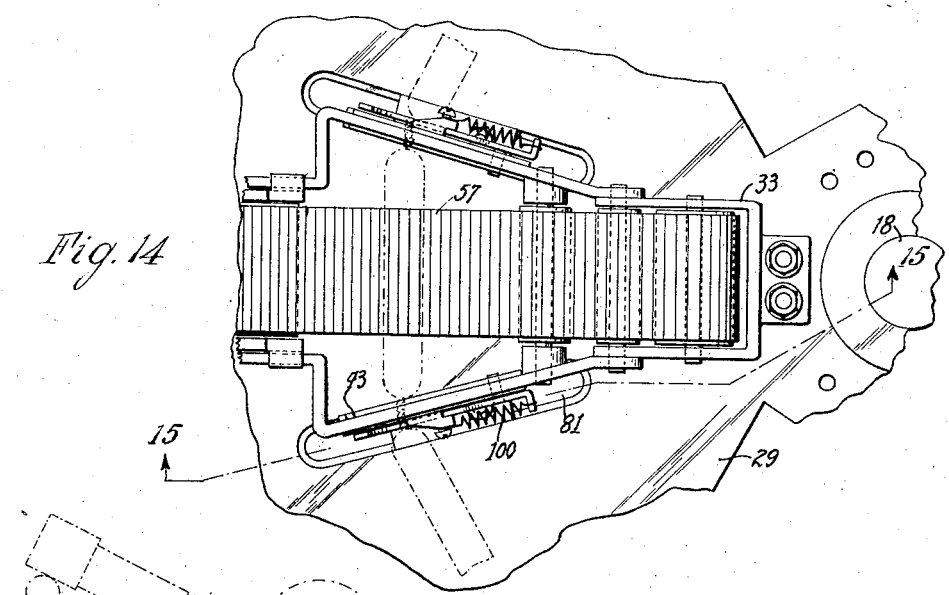
Figure 15:
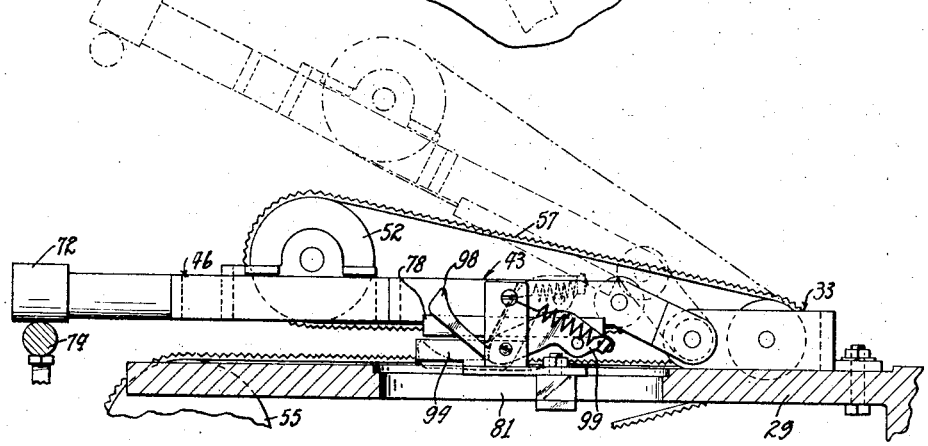
Figure 17:
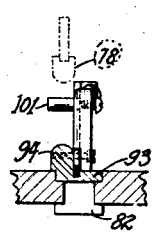
Figure 16:
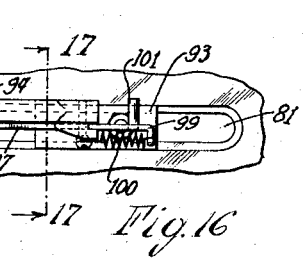

Figures 5 and 6 are sections on the line 5—5 and 6—6 respectively of Figure 4;

Figure 7 is a section on the line 7—7 of Figure 6;

Figure 8 is a section on the line 8—8 of Figure 1;

Figure 9 is a section on the line 9—9 of Figure 3;

Figure 10 is a section on the line 10—10 of Figure 6;

Figure 11 is a detail section on the line 11—11 of Figure 6;

Figure 12 is a detail view;

Figure 13 is a perspective view of a feed chute;

Figure 14 is a fragmentary top plan view of the machine equipped with a holding device;

Figure 15 is a section on the line 15—15 of Figure 14;

Figure 16 is a top plan view of the holding device;

Figure 17 is a section on the line 17—17 of Figure 16; and

Figure 18:
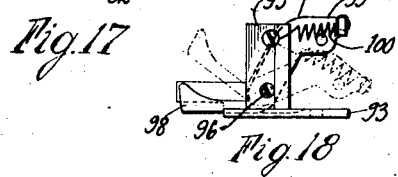

Figure 18 is an elevational view of the holding device.

Referring to the various views of the drawing and particularly to Figure 1, the machine includes a platform 10 in the form of a wheel comprising a rim 11 (Fig. 9) a hub 12 and a plurality of spokes 13. The platform is stationarily supported in slanting position to facilitate discharge of the linked sausage casings by legs 14 and 15, which are connected by braces 16 and 17. A drive shaft 18 extends loosely through the hub 12 of the platform and carries at its lowermost end a worm wheel 19 in mesh with a worm 20 of a horizontal shaft 21 (Fig. 8) journaled in bearings 22 upstanding from a shelf 23 secured to the braces 17. A motor 24 is mounted at one end of the shelf and is electrically connected by a cable 25 to a starting switch 26 at the opposite end of the shelf. The shaft 21 is connected by a universal joint 27 with the motor-shaft 28.

To the upper end of the drive shaft is fixedly secured a circular operating table 29 provided with a hub 30 and a plurality of reinforcing ribs 31. A set screw 32 secures the table to said drive shaft.

On the table are arranged a number of linking mechanisms of identical construction, and the description of one will serve for the understanding of all. Adjacent to the center of the table a U-frame 33 (Figs. 4, 5) is provided with the cross member 34 facing the center and formed with a horizontal flange 35 which is secured to the table by a plurality of bolts 36. In the sides 37 of the U-frame are journaled a pair of pintles 38, and 39, respectively, carrying rollers 40 and 41 respectively. The roller 41 is larger than its companion roller 40 and slightly extends into a slot 42 provided in the table for the passage of a belt, as will be later described. To the pintle 38 is pivotally secured a lever frame generally designated by 43 which comprises diverging arms 44 bent inwardly at their ends to provide shoulders 45 and thence bent to provide U-frame 46 with a cross member 47. A U-frame 48 with its cross member 48ª parallel and adjacent to cross member 47 is disposed interiorly of U-frame 46 and its side members 49 have lugs 50 encompassing the side members of U-frame 46 so that the frame 48 is slidably carried by the U-frame 46. The slide frame 48 is provided with a pintle 51 journaled in bearings 51ª and carrying a roller 52. The table 29 is provided with pendant bearings 53 and 53ª in which a pintle 54 is journaled carrying a roller 55. The roller 55 is comparatively large and extends into a slot 56 provided at the circumference of the table and conterminous therewith. A belt 57 is trained around the roller 52 thence passes around roller 40, is then carried back around roller 55, thence leads to roller 41 and then back to roller 52. The belt is endless and is held taut by a roller 58 carried by a pintle 59 journaled in the arms 44.

Assuming that the roller 55 is driven in counterclockwise direction as indicated by the arrow in Figure 5, then the section 57ª of the belt 57 between rollers 55 and 40 is moved from right to left and the section 57ᵇ between rollers 52 and 40 moves from left to right. Accordingly, sections 57ª and 57ᵇ move in parallel horizontal planes but oppositely to each other for a purpose hereinafter explained.

As indicated in Figures 6, 7 and 9, an incomplete gear 60 is secured to the platform 10 and concentric therewith. The gear encompasses an arc of about 270° and is provided with a number of arcuate slots 61 through which extend bolts 62 to adjustably secure the gear to the platform. The roller pintle 54 carries adjacent the roller 55 a bevel gear 63 (Fig. 7) in mesh with a bevel gear 64 secured to the upper end of an upright stud 65 journaled in a horizontal extension 53ᵇ of bearing 53ª. To the lower end of stud 65 a pinion 66 is fast which meshes with the gear 60.

From the foregoing follows that upon rotation of the table 29 the pinions 66 are rotated and such rotation is transmitted to the roller 55 thereby setting the belt 57 in motion.

From the center of the cross member 48ª of sliding frame 48, a screw 67 extends through a tubular casing 68, (Fig. 5). The inner end of the casing 68 is provided with an extension 69 threaded through a central aperture of cross member 47. The free end of extension 69 carries a nut 70 to secure the casing to cross member 47. The outer end of casing 68 is closed by a screw 71 whose head holds a roller 72 in place. A spring 73 interposed between the head of the screw 67 and the bottom of casing 68 holds the sliding frame 48 in outermost position whereby the belt is kept taut.

The roller 72 rests on a ramp rod 74 which following the outline of the table is arranged above the same and supported from the platform 10 by a plurality of turnbuckles 75 (Figs. 1, 6).

Attention is called to the fact that the ramp rod 74 is provided with a portion 76 (Fig. 3) in a higher plane than the remainder thereof, so that in the circular movement of the roller 72, the latter is lifted to considerable height and subsequently is lowered in the course of travel. The remaining portion of the ramp rod is substantially in the plane of the operating table with the exception of a slight elevation as at 77 to obtain a slight lifting of the roller 72 and its associated parts for a purpose hereinafter explained.

The crimping mechanism comprises bars 78 secured to the frame arms 44 and cooperating with bars 79 (Figs. 6, 11) secured to a horizontal plate 80 which is slidable in an elongated rabbeted slot 81 provided in the table 29. To secure the plate 80 in adjusted position, a retaining member 82 (Fig. 12) is inserted into the slot 81 from below and its threaded stud 83 extends through an aperture in the plate to receive a nut 84. The plate 80 is equipped with a vertical wall 90 to act as a guide wall during the vertical reciprocation of the bars 78.

To the platform 10 a chute 85 is secured by providing the chute with an arm 86 adapted to rest on an angular bracket 87 of the platform. A bolt 88 secures the arm 86 to the bracket there being a slot 89 in the bracket 87 to afford adjustment of the chute for proper feeding of stuffed sausage casing.

A discharge table 90 secured to the platform 10 by brackets 91 forms the continuation of the operating table 29 for the delivery of the linked sausage casing onto a receiving table 92 or other receiving contrivance.

The operation of the machine is as follows:

Upon closing of the switch 26, the motor 24 is set in motion, and therewith the shaft 21 is rotated imparting rotation to the drive shaft 18. The latter affects rotation of the operating table and the parts carried thereby so that the rollers 72 ride on the ramp rod and are lifted by the portion 76 for a portion of their travel and then lowered and again slightly raised at 77. During the rotation of the operating table the endless belts 57 are set in motion, as soon as the pinions 66 mesh with the teeth of the incomplete gear 60. At that time the rollers 72 have been lowered so that belt portions 57ª and 57ᵇ are in parallel planes, as shown in Fig. 5. The lowering of the frame 43 entails close approach of bars 78 and 79 and consequent crimping of the sausage casing arranged therebetween by the chute 85. The sausage casing is crimped at two spaced points by companion sets of crimping bars 78, 79 and as soon as the roller 72 approaches the part 77 of the ramp rod, the pinions 66 mesh with the teeth of gear 60 and the belt 57 is actuated. It is noteworthy that prior to the actuation of the belts the crimping pressure is slightly released by the raised portion 77 of the ramp rod so as to avoid undue strain on the sausage casing while the same is rotated around its axis in order to obtain linking.

The provision of the adjustable gear 60 permits variation of the number of revolutions imparted to the sausage casing. Thus, if the revolutions of the sausage casing are to be increased, the bolts 62 (Fig. 9) are loosened and the gear 60 is given a slight rotation counterclockwise so that linking is started at an earlier period in the cycle of operations. On the other hand, a decrease of linking revolutions is effected by slightly turning the gear 60 in clockwise direction.

Attention is furthermore called to the fact that the linking of the casings is effected by a single element in the form of an endless belt which, as pointed out before, has portions moving in opposite directions, one portion being arranged to be raised or lowered and acting under gravity to effect linking and crimping of the casing.

In order to vary the length of the sausages, the plate 80 (Fig. 10) may be adjusted so as to shift the engagement between clamping bars 78, 79.

In Figures 14 to 18, a slight modification is illustrated. Here a plate 93 is provided which is equivalent to plate 80 and is also equipped with a bar 94 co-operating with the bar 78. The plate 93 has a vertical wall 95 which has a pin 96 constituting a pivot for a bell crank lever 97 whose one arm 98 abuts the inner side of the bars 78, 94 and whose other arm 99 is connected by a spring 100 to the wall 95. The arm 99 has a pin 101 in the path of bar 78. Upon descent of frame 43 the bar 78 actuates the bell crank lever to raise the arm 98 which constitutes a retaining device for the sausage casing crimped between the bars 78, 94.

In the drawings a preferred embodiment of the invention has been shown but merely by way of example and not by way of limitation.

Numerous changes and alterations may be made within the principle of the invention. I, therefore, do not limit myself to the details of construction or arrangement as shown, but include all changes, modifications rearrangements and variations constituting departures within the scope of the invention as defined in the appended claims.

I claim:

1. In a machine of the class described, gravity actuated means for engaging a sausage casing at remote points, and flexible means for revolving the casing between points of engagement.

2. In a machine of the class described, gravity actuated means for crimping a sausage casing at remote points, and flexible means for revolving the casing between points of engagement.

3. In a machine of the class described, flexible means acting under gravity for revolving a sausage casing around its longitudinal axis.

4. In a machine of the class described, flexible means acting under gravity for revolving a sausage casing around its longitudinal axis.

5. In a machine of the class described, flexible friction means acting under gravity to revolve a sausage casing around its longitudinal axis.

6. In a machine of the class described, a single means adapted to revolve a sausage casing around its longitudinal axis, and gravity means for actuating a portion of said means.

7. In a machine of the class described, a gravity actuated single member having portions in opposite directions for revolving a sausage casing around its longitudinal axis.

8. In a machine of the class described, a single flexible member having portions moving in opposite directions for revolving a sausage casing around its longitudinal axis said member acting under gravity.

9. In a machine of the class described, means for engaging a sausage casing at separate points, an element adapted to revolve the sausage casing around its longitudinal axis between said points, and means for causing a portion of said element to act under gravity.

10. In a machine of the class described, means for engaging a sausage casing at distant points, a gravity actuated element for revolving the sausage casing around its axis between said points, and a cam for controlling a portion of said element.

11. A device for linking sausages, including gravity actuated means moving in a devious path for engaging a sausage casing at spaced points, and flexible means on said first named means for revolving the sausage casing around its axis between said points.

12. A device for linking sausages, including gravity actuated means moving in a devious path for engaging a sausage casing at spaced points, and flexible means carried by said first named means and moving in a rectilinear path for revolving the sausage casing around its axis between said points.

13. A device for linking sausages, including gravity means moving in a devious path for engaging a sausage casing at spaced points, and flexible means on said first named means for revolving the sausage casing around its axis between said points.

14. In a machine of the class described, gravity actuated means for crimping a sausage casing at spaced points, flexible means for revolving the sausage casing around its axis between said points, and a cam controlling said first and second means.

15. In a machine of the class described, a rotary support, means for crimping a sausage casing at spaced points, on said support, a single member carried by said support for revolving the sausage casing, and means for actuating said member.

16. In a machine of the class described, a rotary support, means for crimping a sausage casing at spaced points on said support, a single flexible member carried by said support for revolving the sausage casing, and means for actuating said member.

17. A machine of the class described, including a rotary support, bars on said support, means carried by said support and co-operating with said bars to effect crimping of the sausage casing under gravity, and flexible means for revolving the crimped casing.

18. A machine of the class described, including a rotary support, bars on said support, means carried by said support and co-operating with said bars, for crimping said sausage casing, an element for revolving the casing between crimpings, and means for actuating said element to engage the sausage casing under gravity.

19. A machine of the class described, including a rotary support, bars on said support, gravity actuated means carried by said support and co-operating with said bars for crimping a sausage casing, an element for revolving the casing, a portion of said element acting under gravity, and means for actuating said element.

20. A machine of the class described, including means for crimping a sausage casing at spaced points, and a single element movable on said means for revolving the casing between said points a portion of said element acting under gravity.

21. In a machine of the class described, an endless belt adapted to revolve a sausage casing around its longitudinal axis a portion of said belt acting under gravity.

22. In a machine of the class described, an endless belt acting under gravity for revolving a sausage casing around its longitudinal axis.

23. In a machine of the class described, an endless belt having portions moving in opposite directions for revolving a sausage casing around its longitudinal axis said belt acting under gravity.

24. In a machine of the class described, means for engaging a sausage casing at separate points, an endless belt adapted to revolve the sausage casing around its longitudinal axis between said points, and means for causing a portion of said belt to act under gravity.

25. A device for linking sausages, including means moving in a devious path for engaging a sausage casing at spaced points under gravity, and an endless belt on said means for revolving the sausage casing around its axis between said points.

26. A device for linking sausages, including means moving in a devious path for engaging a sausage casing at spaced points under gravity, and an endless belt carried by said means and moving substantially in a rectilinear path for revolving the sausage casing around its axis between said points.

27. In a device for linking sausages, gravity actuated means for crimping a sausage casing at spaced points, an endless belt for revolving the sausage casing around its axis between said points, and a cam controlling said means and said belt.

28. In a device for linking sausages, a rotary support means for crimping a sausage casing at spaced points on said support, and an endless belt carried by said support for revolving the sausage casing around its axis between said points.

29. In a device for linking sausages, a rotary support means for crimping a sausage casing at spaced points on said support, and an endless belt carried by said support for revolving the sausage casing around its axis between said points, and means for actuating said belt.

30. In a device for linking sausages, a rotary support, gravity actuated means on said support for crimping a sausage casing at spaced points, an endless belt carried by said support for revolving the sausage casing, and means for causing portions of said belt to move in opposite directions.

31. In a device for linking sausages, gravity actuated means for engaging a sausage casing at remote points, flexible means for revolving the casing between points of engagement, and means for varying the number of revolutions of the casing.

In witness whereof I affix my signature.

OSCAR G. MAYER.